United States Patent [19]

Beardsley et al.

[11] 4,161,301
[45] Jul. 17, 1979

[54] DEPLOYMENT APPARATUS FOR STORES FROM VEHICLES

[75] Inventors: Richard G. Beardsley, Gainesville; Norman S. Currey, Atlanta, both of Ga.

[73] Assignee: Lockheed Corporation, Burbank, Calif.

[21] Appl. No.: 881,175

[22] Filed: Feb. 27, 1978

[51] Int. Cl.² ............................................. B64D 1/10
[52] U.S. Cl. .......................... 244/137 R; 244/118 R; 89/1.5 R
[58] Field of Search ............... 244/118 R, 137 R, 136; 89/1.5 R, 1.5 H; 214/516

[56] References Cited

U.S. PATENT DOCUMENTS 3,371,891  3/1968  Brader et al. .................... 244/137 R

FOREIGN PATENT DOCUMENTS

1074825  7/1967  United Kingdom ................ 244/137 R

Primary Examiner—Barry L. Kelmachter
Attorney, Agent, or Firm—John J. Sullivan

[57] ABSTRACT

This apparatus proposes to sequentially deploy stores, such as mines or missiles, from a moving vehicle, such as an airplane or ship, at a predetermined rate and velocity. It includes modular palletized stowage of these stores, limited in size and shape only by vehicle weight and/or space considerations, devices to lock the pallets together and to the vehicle, a cradle to support and facilitate propulsion of the stores prior to launch, a drive mechanism to propel the stores through the pallets, and devices to properly release each store from the vehicle and from its cradle.

10 Claims, 17 Drawing Figures

Fig_3

Fig_6    Fig_7

Fig_8    Fig_9

DEPLOYMENT APPARATUS FOR STORES FROM VEHICLES

This invention relates to deployment systems for onboard cargo from vehicles during vehicle movement and more particularly to such a system especially designed and adapted to be employed in minelaying operations and the like where individual packages or stores are to be deployed in successive releases at spaced intervals.

In minelaying operations, whether from airborne or surface borne vehicles, an indefinite number of mines are dropped from the moving vehicle at selected intervals. Such intervals vary from rapid succession to delayed spacing but in any case with precision with respect to both time and location. Also, different size, shape and type mines may be involved in any given operation, and the number of mines accommodated on the vehicle is only restricted by the weight and/or space limitations of that vehicle.

In order to assure an efficient minelaying operation it is felt that proper loading of the several mines on or within the vehicle is important. Such loading would be facilitated by pre-loading the mines in carriers which are stacked and/or palletized whereby they are readily stored until needed and then quickly moved onto the vehicle. When on board, the several carriers are secured in position against all relative movement until released just prior to ejection.

Presently existing deployment systems have evolved from earlier developed bombing and torpedoing techniques and leave much to be desired in today's missile launching, minelaying and such operations. Thus, in the case of minelaying from aircraft for example the use of externally mounted bomb racks which are extended outwardly or through bomb bays and similar contraptions are not efficient. When laying mines, as opposed to some of the other deployment operations, it is very important to know precisely the ultimate location thereof to avoid their accidental discharge by friendly allies.

Unlike bombing, minelaying from air vehicles is accomplished at relatively low altitudes in or close to enemy territory where speed and expeditiousness are more critical. Preloading, sequencing, and release of the several mines are, therefore, essential and to a degree greater than that in other deployment operations.

The present invention is directed to an improved deployment apparatus for stores from vehicles and especially for minelaying. This apparatus is based on a pallet concept permitting the assembly of a plurality of pre-loaded deployment carriers which are utilized for mine stowage and transportation to the delivery vehicle, stowage within the vehicle and subsequent deployment. The carrier or pallet herein contemplated is capable of carrying a plurality of various mines and includes connecting adaptors for each individual mine. This common pallet may be interconnected with another similar pallet to form a train as well as stacked on top of another pallet to produce a multi-tier assembly and may be installed in various order in the vehicle as they are taken from the storage facilities. Thus installed, the pallets are designed and constructed to cooperate with complementary apparatus carried by the vehicle, being sufficiently flexible to ensure an adequate distribution of load on the vehicle both during loading and vehicle movement.

More specifically, each carrier pallet consists essentially of a platform or frame on which a plurality of cradles are mounted, each adapted to receive and contain a selected mine from a variety of sizes and shapes. A drive mechanism on each pallet terminates in fittings which permit the inline interconnection of similar pallets. Top and bottom, each pallet carries connector elements which permit the interconnection thereof in tiers or stacks and all pallets include the necessary attachment elements for connection to complemental fore, aft and side restraint structure of the vehicle. Also anti-friction devices are provided between the stacked carrier pallets as well as between the mine carrying cradles and the pallet frame to facilitate both the movement of the several pallets with respect to each other and the cradles during deployment.

With the above and other objects in view as will be apparent this invention consists in the construction, combination and arrangement of parts all as hereinafter more fully described, claimed and illustrated in the accompanying drawings wherein:

Referring more particularly to the drawings 10 designates the fuselage of an airplane having an internal hold 11 and an ingress and egress opening 12 adjacent its aft end with an associated door 13. The door 13 is comprised of two sections 13' and 13" each hinged as at 14 at remote ends and adapted to abut at and along adjacent ends 15 where they are secured in any conventional manner during flight. This position of the door sections 13' and 13" is shown in phantom lines in FIG. 1 and corresponds to the normal cruise and ground taxiing operations of the airplane 10.

Figure 1:
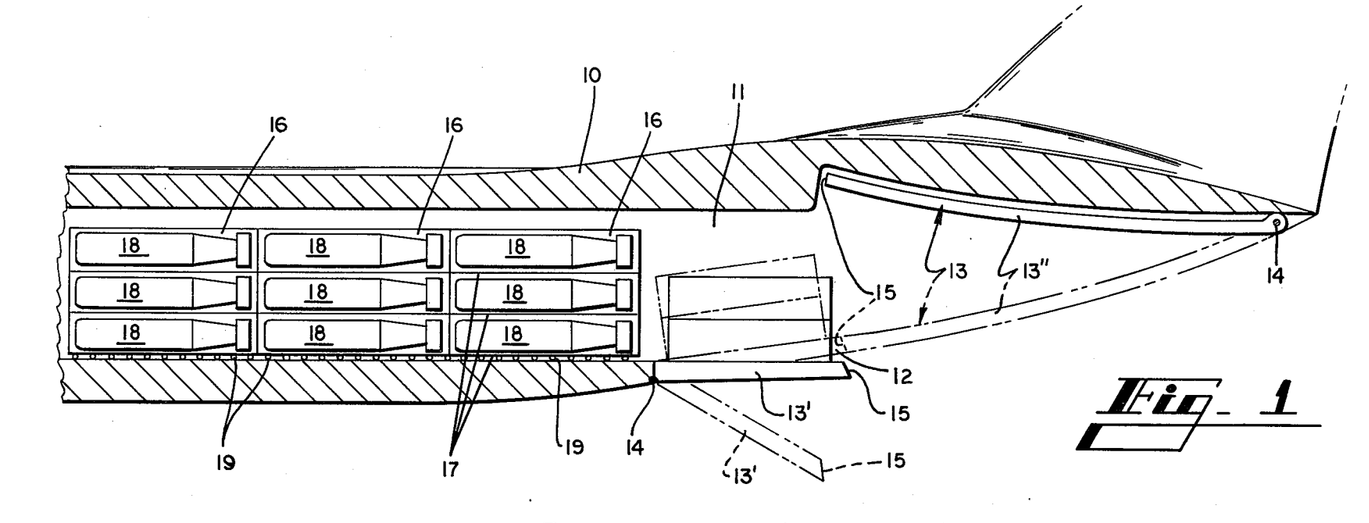
FIG. 1 is a longitudinal side section of the hold of an airplane having an access door and a ramp in the aft end thereof, the closed positions thereof being shown in phantom lines, to illustrate by way of example loading and stacking of a plurality of cargo carrying pallets and associated ejector pallets in the airplane for deployment therefrom during flight as contemplated by the present invention.
Figure 2:
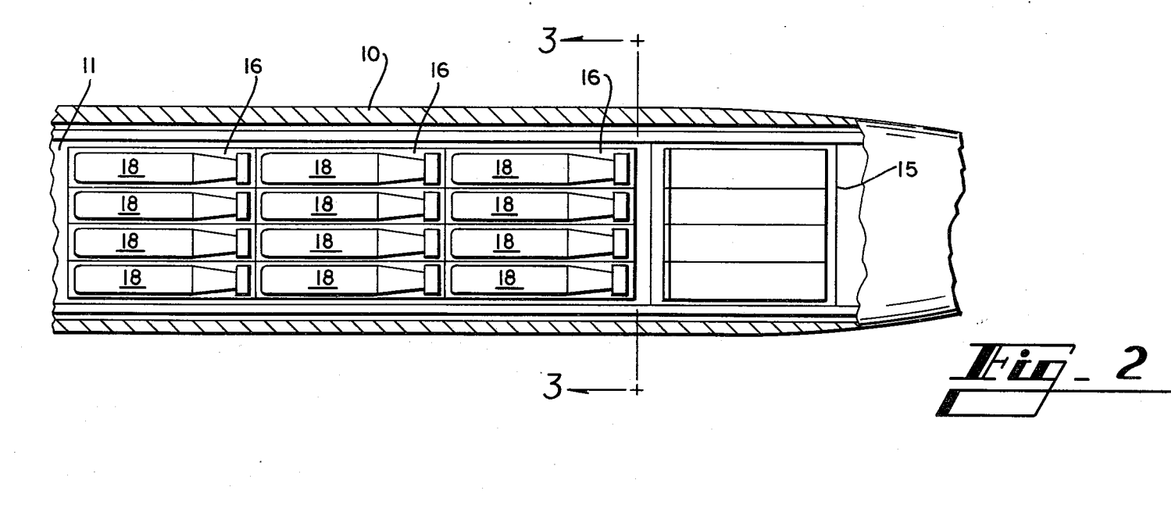
FIG. 2 is a longitudinal plan section of the airplane hold of FIG. 1 to illustrate the arrangement of the several cargo carrying pallets in rows in alignment with their respective ejector pallets.
Figure 3:
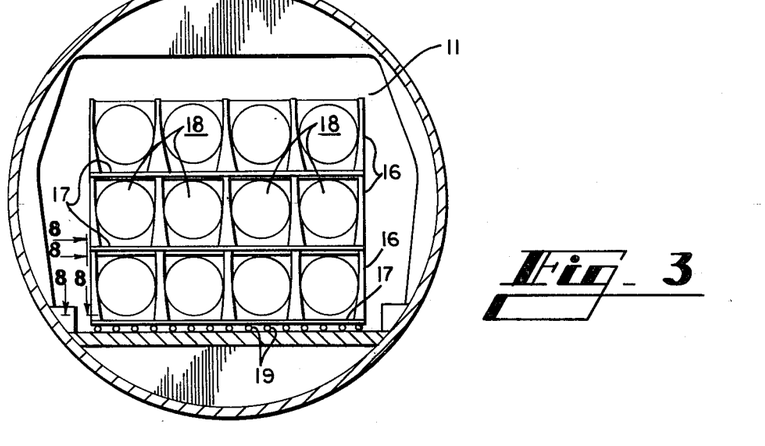
FIG. 3 is a section taken along line 3—3 of FIG. 2.
Figure 4:
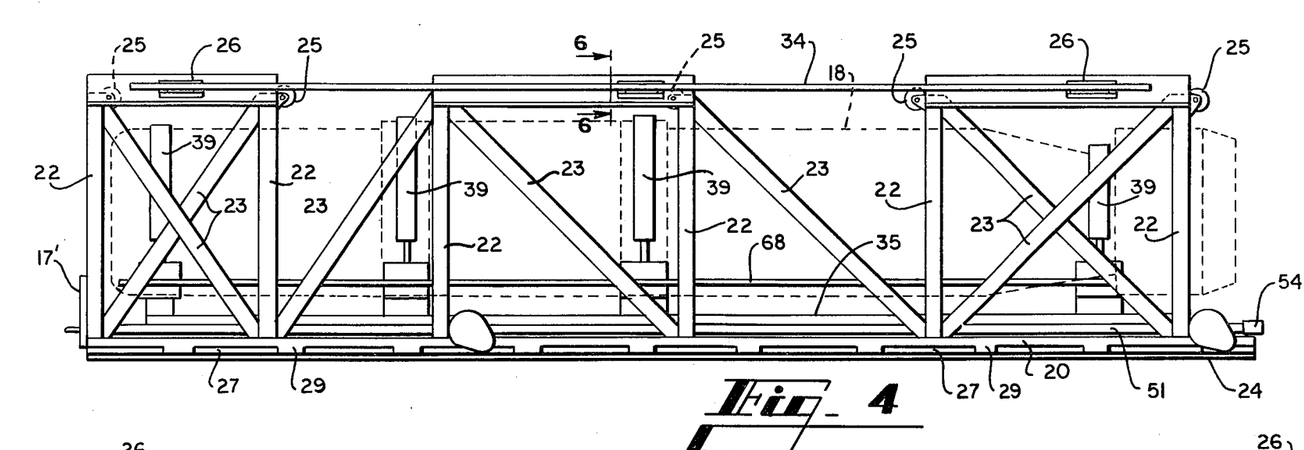
FIG. 4 is a side view of a single cargo carrying pallet adapted to carry for example four stores disposed therein in substantive parallel or side-by-side alignment, the location and position of a store therein being shown in dotted lines.
Figure 5:
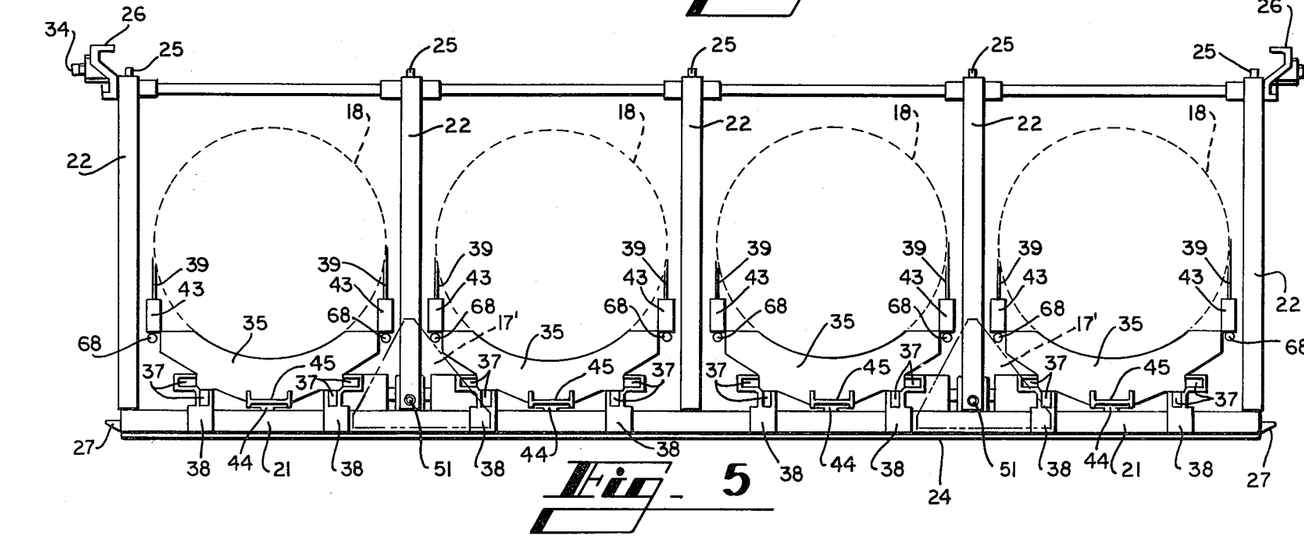
FIG. 5 is an end view of the cargo carrying pallet shown in FIG. 4 with each store shown therein in dotted lines.
Figure 6:
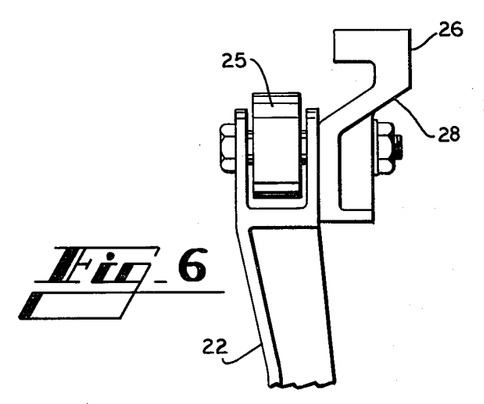
FIG. 6 is a view taken along line 6—6 of FIG. 4 to show one of the several engagement and roller members carried by each of the pallets and operable to permit sliding fore and aft movement of the pallets in one course or tier relative to those in the next upper course or tier while securing such pallets against all relative vertical movement.
Figure 7:
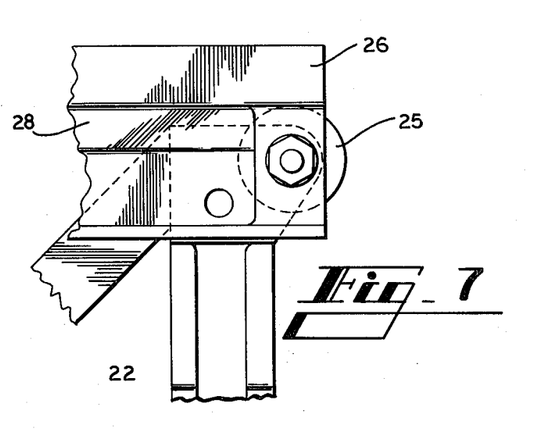
FIG. 7 is a view of the same engagement and roller member shown in FIG. 6 taken from the right thereof.

In the open position, as shown in solid lines in FIG. 1, the forward section 13' of the door 13 may be disposed with its inner surface extending in line with the floor of the hold 11 corresponding to the air drop position or extending at an obtuse angle with the hold floor as shown in phantom lines for contact with the ground or other surface for on-and-off cargo loading. The aft section 13" of the door 13 is at both such times disposed inwardly of the airplane hold 11 in substantial abutment with the ceiling thereof as shown in solid lines. In either event the opening 12 is unobstructed for the free and unrestricted movement of cargo therethrough.

In accordance with the teachings of this invention a plurality of either single or multiple tier modules 16 are especially designed and adapted to be preassembled and stored ready to be taken aboard, stowed within the airplane 11 and subsequently ejected therefrom during flight. To this end each module 16 comprises a transport pallet 17 capable of retaining and carrying for example four individual stores or mines 18 disposed in parallel or side by side position. Thus, a number of modules 16 may be disposed with the several mines 18 of each tier or course thereof in axial alignment with the mines 18 of the other modules 16 and when so assembled, loaded into the airplane hold 11, passing over anti-friction means, such as a multiplicity of rollers 19 in the floor of the airplane hold 11.

Figure 10:
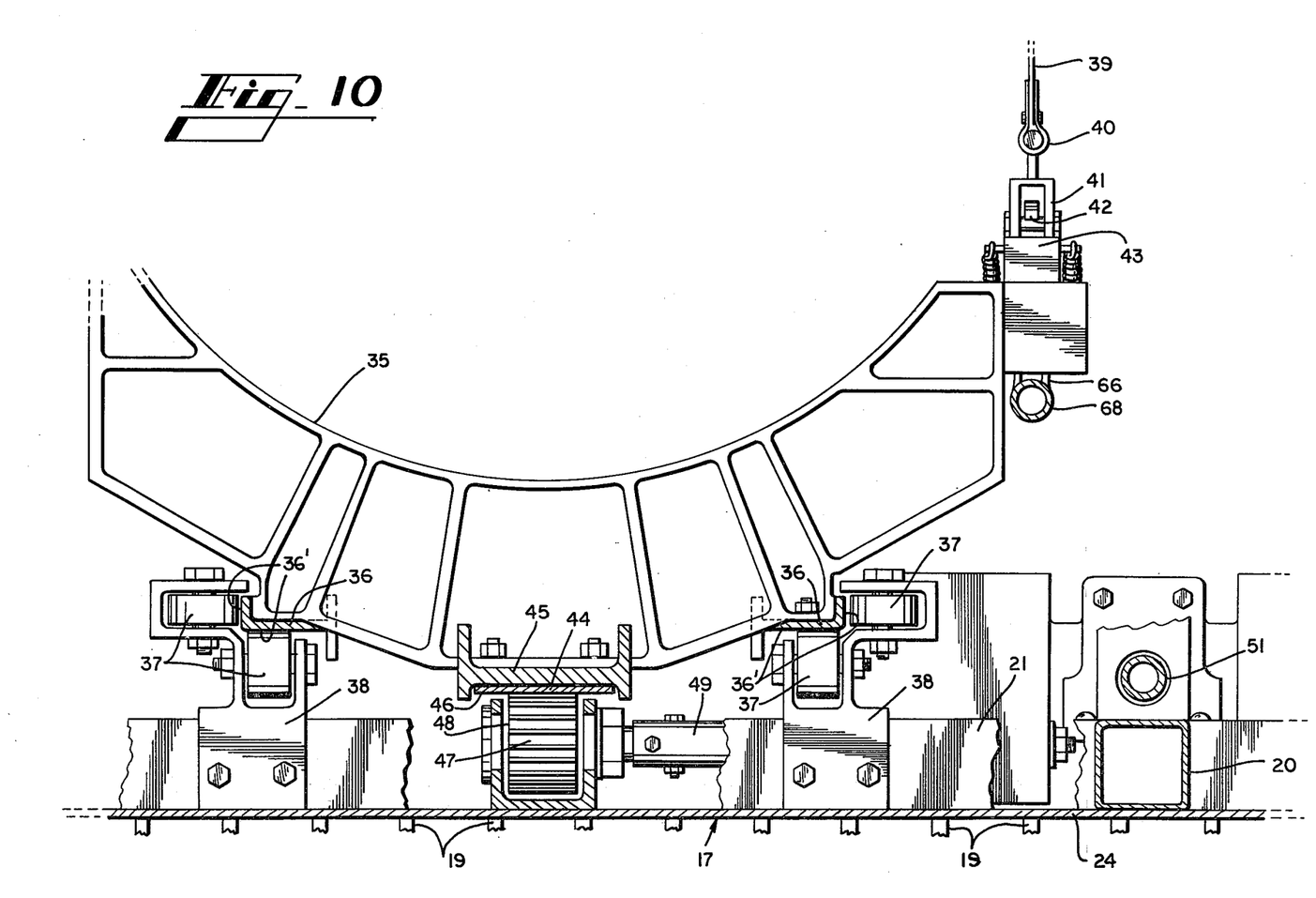
FIG. 10 is a transverse section taken through a portion of one of the pallets and an associated mine carrying cradle to show the interrelationship thereof in supporting the mine as well as the mechanism for moving the mine along the pallet.

Each pallet 17 is formed by a framework of longitudinal and lateral beams 20 and 21 respectively and vertical stanchions 22 interconnected by appropriately arranged crossbraces 23. The bottom of each pallet 17 is defined by a flat surface 24 (FIG. 10), the pallet surface 24 of the bottom pallet 17 of each module 16 being adapted to coact with the rollers 19 mounted in the hold floor facilitating the movement of the modules 16 into and out of the airplane 10.

Associated with the upper end of each stanchion 22 is a roller 25 adapted to contact the under side of the surface 24 of the next upper pallet 17 whereby to facilitate stacking of the pallets 17 one on top of another. In order to secure the upper pallets 17 in each stack against vertical movement relative to the lower pallets 17, as well as the modules 16 relative to the hold floor as the result, for example of up loads, a clamp 26 is provided on each of the outermost stanchions 22 adjacent its top. Each of these clamps 26 overlaps and engages a companion flange 27 carried by and projecting from each longitudinal beam 20. In addition, an upper rail 28 is provided at and along the ends of the outermost stanchions 22 adjacent their tops whereby the several stanchions 22 on opposite sides of each pallet 17 are interconnected.

Figure 8:
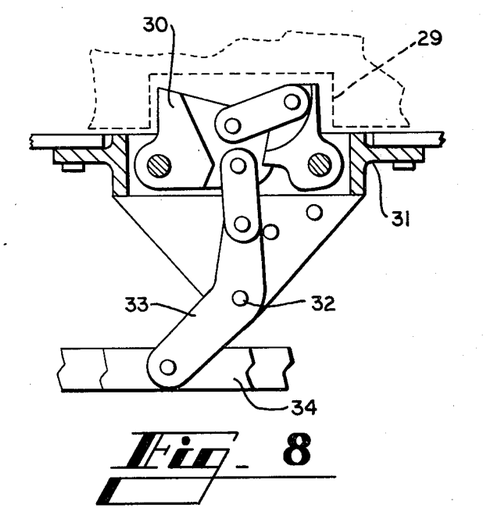
FIG. 8 is a section taken along line 8—8 of FIG. 3 to show one of the several engagement mechanisms carried by the stationary airplane structure as well as the upper end of each pallet and operable to secure each adjacent bottom pallet thereto against fore and aft movement in the airplane hold, the mechanism being shown in the operative or engaged position.
Figure 9:
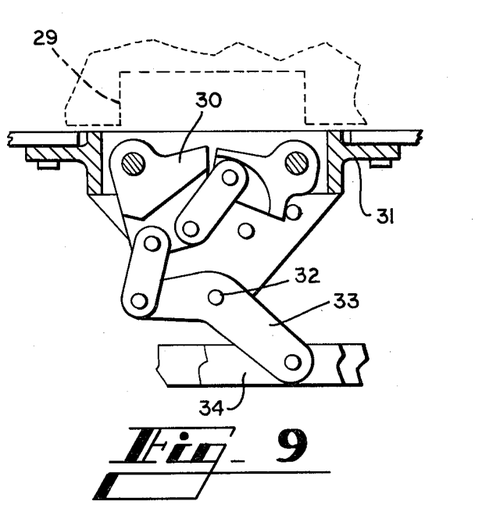
FIG. 9 is a similar view showing the same engagement mechanism in the inoperative or released position.

For the purpose of securing each of the stacked pallets 17 against fore and aft and lateral load one or more notches 29 (FIGS. 8 and 9) are provided in each longitudinal beam 20 to receive complemental retractable projections 30 mounted in the adjacent pallet rail 28 and in the fixed structure of the aircraft 10. Each such projection 30 is an articulated mechanism pivotally mounted on a stationary bracket 31 as at 32 through a bellcrank 33. At its outer end the bellcrank 33 is adapted to connect to a push-pull rod 34 or the equivalent whereby all of the bellcranks 33 are actuated in unison to thereby withdraw the several projections 30 and release the associated pallets 17 and module 16 for relative fore and aft movement in the airplane hold 11.

Each store or mine 18 is disposed in proper i.e., the desired position on the pallet 17 by means of a cradle 35 configured at and along its upper surface to receive and support its mine 18, one such cradle 35 being located between each pair of adjacent stanchions 22 extending from the lateral beam 21. At and along its under side each cradle 35 is formed or otherwise provided with a pair of spaced longitudinal rails 36 operative on and against rollers 37. Each such cradle rail 36 is angular in cross-section to thereby provide outer surfaces 36' to cooperate with each set of the rollers 37 which are mounted at right angles to each other, being mounted in such position in longitudinal alignment on an upstanding support bracket 38 secured to each lateral pallet beam 21. Thus disposed, the several rollers 37 serve to take both the down-load and the side-load of the cradle 35 and its mine 18.

In order to take the up-load of the cradles 35 and their mines 18 a number of straps 39 are employed, being wrapped around each mine 18. Each of these straps 39 terminates at its opposite ends in a fitting 40 and a depending clevis 41 adapted to receive and engage a hook 42 secured to the cradle 35 through appropriate connections to a release mechanism 43, each hook 42 being spring-loaded in the strap retention position by linkage 43' within the release mechanism 43, the operation of which will be described in more detail hereinafter. The up-load is thereby transmitted to each cradle 35, and is ultimately reacted by the top face of the cradle 35 butting against the lower face of the upper flanges of the associated brackets 38.

On the under side of each cradle 35 between its rails 36 is a rack 44 secured thereto by means of and through a rack support 45. The rack 44 is thereby made to extend substantially the full length of its cradle 35 and provides depending teeth 46 for coaction with the meshing teeth 47 of a pinion gear 48. At least two such pinion gears 48 are employed in the length of each rack 44, each gear 48 being connected through an axle 49 and transfer/reduction gear 50 to a drive shaft 51. The drive shaft 51 is common to all the transfer/reduction gears 50 associated with each rack 44 being interconnected thereto through bevel gears 52 on the drive shaft 51 and each transfer/reduction gear shaft 53 whereby the pinion gears 48 may be driven in unison.

Two such drive shafts 51 are mounted on each pallet 17, being located on each longitudinal rail 20 between adjacent cradles 35 so as to be common to the gear trains 52, 50 and 48 associated with the rack 44 of each whereby a single motor 54 may be employed to drive either cradle 35. A conventional clutch and brake 55 is associated with each forwardmost transfer/reduction gear 50 to permit the drive of a selected one of the cradles 35 at a time, while a conventional over-running clutch and brake 55' is associated with each of the remaining transfer/reduction gears 50 for reasons to become more apparent.

Figure 12:
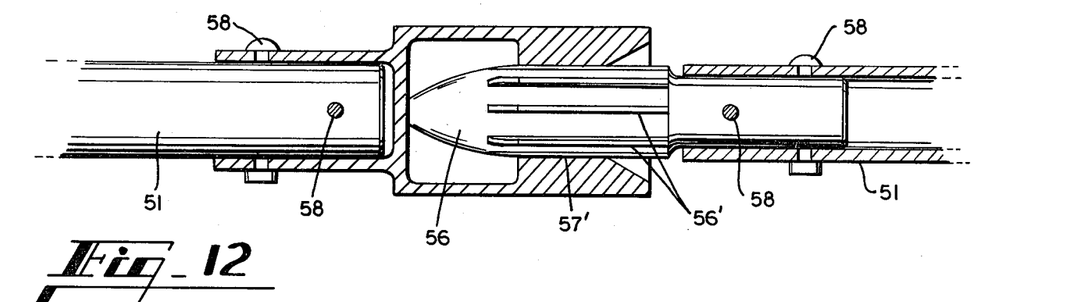
FIG. 12 is a section taken through the end portions of the drive shaft carried by adjacent pallets to show the connector elements thereof in the engaged position whereby rotary movement thereof in unison is effected.
Figure 13:
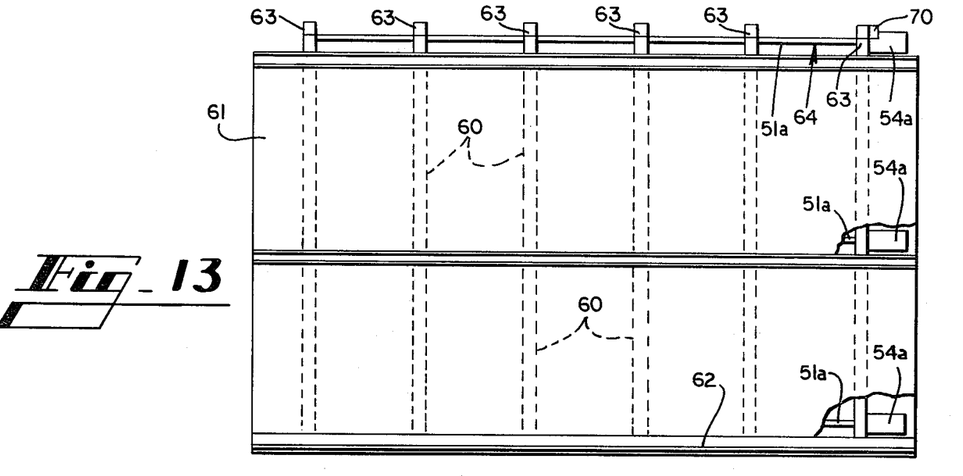
FIG. 13 is a side elevation of the ejector pallet module shown generally in FIG. 1 adjacent the aft access door in the airplane hold.
Figure 14:
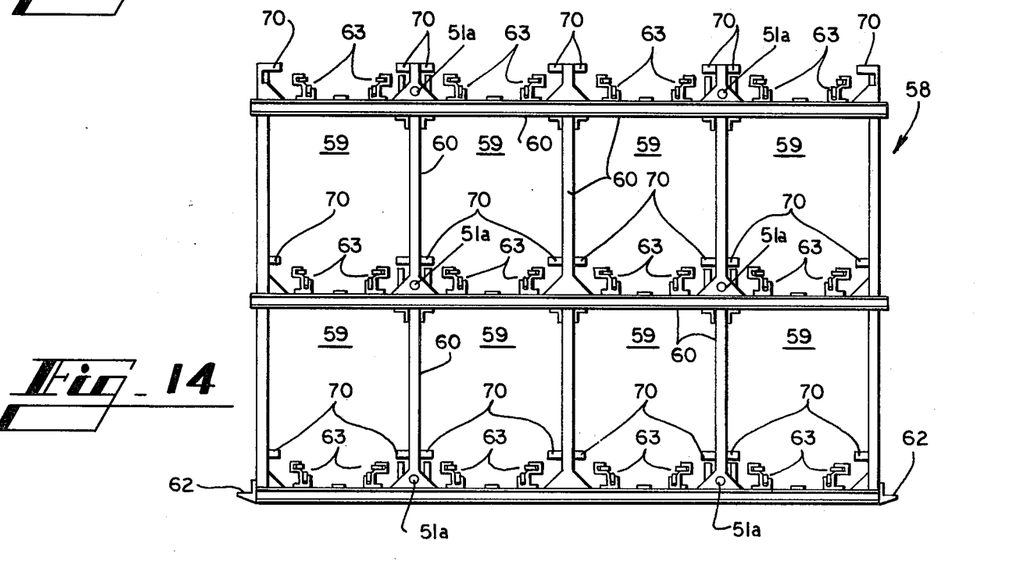
FIG. 14 is a front view of the same ejector pallet module i.e., a view from the left of FIG. 13.
Figure 15:
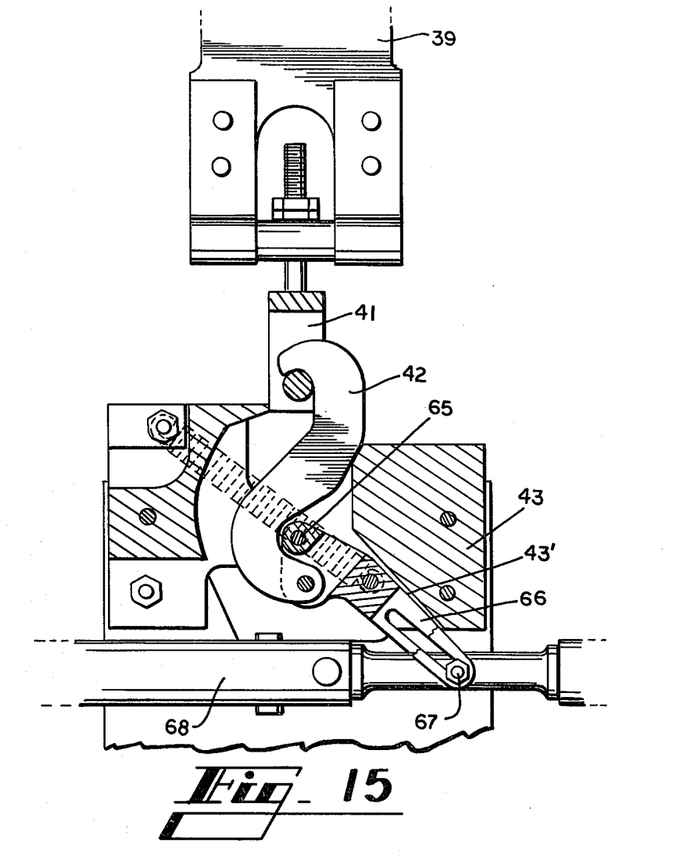
FIG. 15 is a side view partly in section of one of the several release mechanisms carried by each mine supporting cradle showing it in position engaging its strap by which the mine is secured on the cradle and a portion of the push/pull rod or tube by which all of these mechanisms of each cradle are operated in unison.
Figure 16:
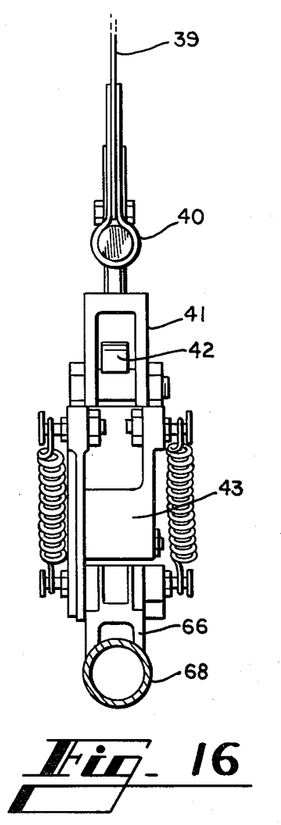
FIG. 16 is an end view of the same cradle release mechanism, i.e., a view from the left of FIG. 15.
Figure 17:
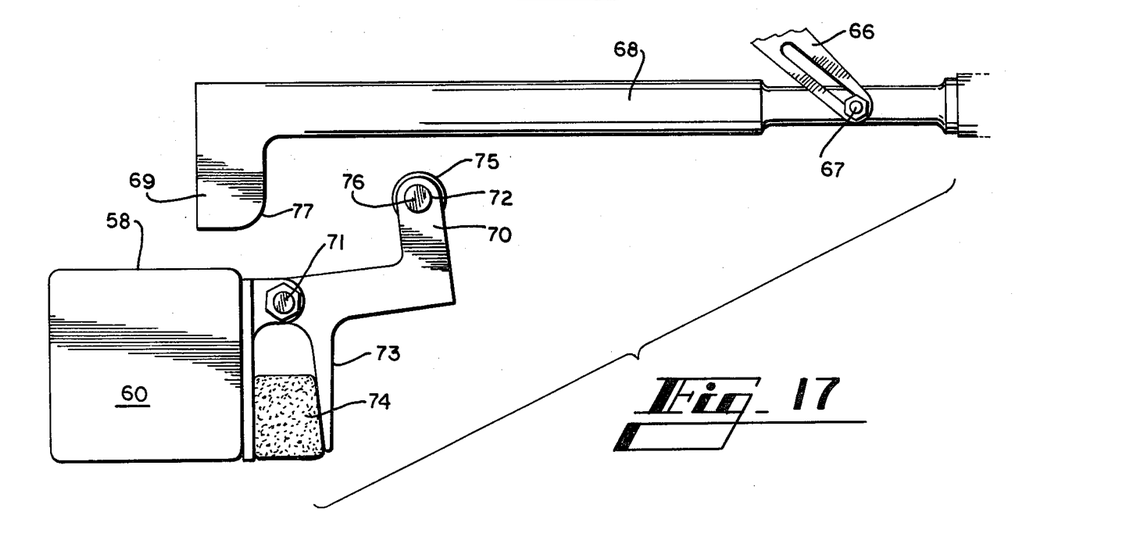
FIG. 17 is a side view of the forward end portion of the push/pull tube of each set of cradle release mechanisms shown adjacent a tripper device carried by each ejector pallet aft end whereby the several cradle release mechanisms are actuated in unison.

In order to coordinate the operation of all of the mine carrying cradles 35 in each of the four longitudinal lines and to facilitate their movement by the motor 54 common to each pair of laterally adjacent cradles 35 the adjacent ends of the drive shafts 51 are interconnected as illustrated in FIG. 12. Thus, coacting male and female elements 56 and 57 respectively are provided on opposite ends of each shaft 51 and the adjacent pallets 17 are thereby interconnected. These elements 56 and 57 are each secured by conventional means 58 to their respective shaft ends and include complemental splines 56' and 57' which interengage and transfer rotary movement from one shaft 51 to the next shaft 51.

In addition, adjacent the male element 56 of each shaft 51 is a motor attachment plate 17' secured to the forward end of each pallet 17. Each such plate 17' is provided with holes adapted to align with similar holes in a mounting plate 54' carried by each motor 54 to facilitate the connection of each motor 54 thereto by conventional means. When so connected the drive shaft 54" of the motor 54 engages the adjacent male element 56 and thereby serves as a common source of rotary power for the several drive mechanisms of the aligned pairs of adjacent cradles 35.

In view of the foregoing arrangement and construction it is apparent that on-ground, prepackaging of the several selected mines 18 can be accomplished in modules 16, each for example being three tier and four abreast. Such modules 16 are thus ready for on-board loading into the airplane hold 11 through the opening 12 in fore and aft alignment. Such loading is facilitated by locating the door section or ramp 13' in either of its open positions depending upon the adjacent loading surface. As each module 16 enters the hold 11 it slides freely on the rollers 19 to its ultimate position. The adjacent modules 16 are then interconnected through the several elements 56 and 57 of the shafts 51 and the modules 16 are secured to the fuselage structure through the locking mechanism provided by the several projections 30 in engagement with their notches 29 in the longitudinal beams 20 in the bottom pallets 17 of the modules 16.

With the entire mine payload thus onboard the airplane 10, an ejector module 58 is installed. This ejector module 58 is a multiple cell assembly, the units or bays 59 of which correspond to and align with the transport pallets 17 previously described. To that end the ejector module 58 is formed by a plurality of longitudinal, lateral and vertical members 60 interconnected by bolts or the like into a unitary assembly, the vertical members serving to connect the interconnected longitudinal and lateral members 60 of adjacent tiers. If desired or required this ejector module 58 may be enclosed by side walls or sheets 61 to give it additional structural rigidity. In any event the module 58 is adapted to be secured to the ramp 13' in any conventional manner so as to be immovable and thereby form, in effect, an integral part of the ramp 13'. To facilitate this, flanges 62 similar in all respects to the flanges 27 on the pallets 17 may be provided on the sides of the module 58 for coaction with suitable clamping or engagement elements carried by the adjacent fuselage structure.

Figure 11:
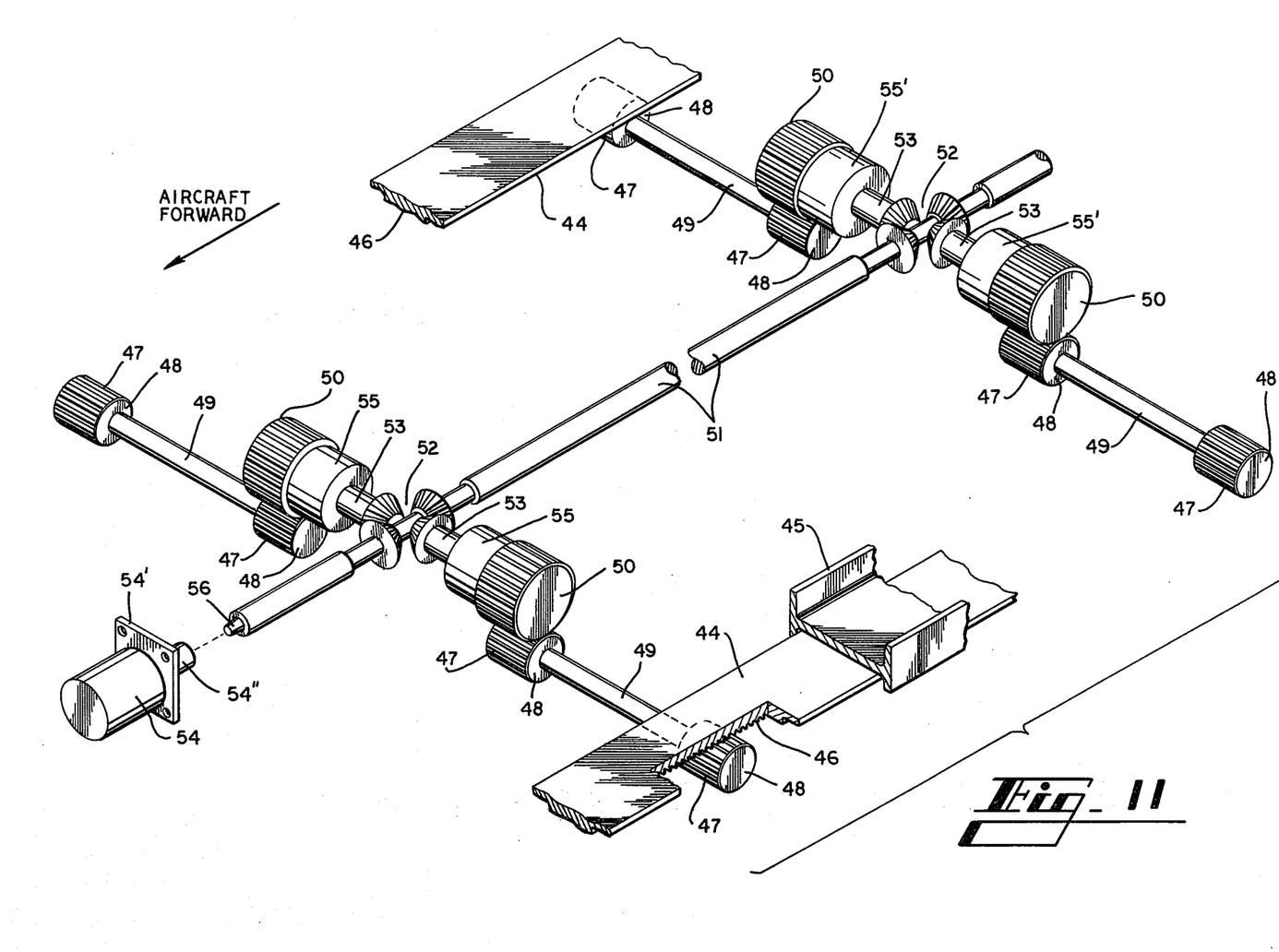
FIG. 11 is a perspective view of one of two identical drive mechanisms, each carried by, and operative to engage structure of each pair of adjacent mine carrying cradles and individually move them linearly of the pallets, only a fragment of the associated cradle structure being illustrated.

Within each bay 59 of the ejector module 58 are provided two sets of rollers 63 equivalent to the rollers 37 on the pallets 17 adapted to receive and coact with the longitudinal rails 36 of the cradles 35 as they move aft of the fuselage hold 11 upon operation of the associated motor 54 as described. A power mechanism similar in all respects to that illustrated in FIG. 11 is associated with each adjacent pair of bays 59 of the module 58. Each mechanism comprises a motor 54a and connected drive shaft 51a with at least one set of bevel gears like 52 connected to pinion gears like 48 having teeth like 47 adapted to engage the rack 44 of each cradle 35 as it moves aft. A shaft like 53 connects each complementary bevel gear like 52 to a clutch/brake like 55 and transfer/reduction gear like 50 connected to each axle like 49 on which a pinion gear like 48 is mounted.

The motors 54a associated with the ejector module 58 may be required to operate at a speed appreciably greater than that of the motors 54 associated with the transport modules 16 due to desired mine trajectory characteristics. The spacing of the last two pinions 48 in relation to each other and to the forward pinion 48 of the ejector module 58 is such that when the rack 44 of each cradle 35 reaches the forward ejector module pinion 48 it is in engagement with only the last transport module pinion 48, i.e., the pinion 48 connected to the drive shaft 51 through the overrunning clutch 55'. Thus, where there is a transition of each cradle 35 from a relatively slow speed to a relatively high speed no damage occurs to the gearing and the mine bearing cradle 35 is ejected from the airplane 10 at the desired speed.

As each cradle 35 is jettisoned in the above manner, the release mechanism 43 securing the mine 18 to its cradle 35 is automatically actuated to permit separation of the mine 18 from its cradle 35 which is thus expended. More particularly, the several hooks 42 of the mechanism 43 which engage the mine securing straps 39 are pivotally mounted, as illustrated at 65, to actuating links 66 slidably connected, as at 67, to a push-pull rod or tube 68 common to all such links 66 in longitudinal alignment. At its forwardmost end each tube 68 terminates in an angular projection or trigger 69 designed and adapted to strike an obstruction or tripper 70 secured to and projecting laterally from the aft end of the ejector module 58 adjacent each side of each bay 59. Each such tripper 70 is pivotally mounted, as at 71, to the aft end of the associated module member 60, and formed with opposite ends 72 and 73 capable of rotation to a predetermined degree on its pivot 71.

The tripper end 72 is normally disposed in the path of the trigger 69 by means of a resilient element, e.g., a rubber pad 74 secured in position in any suitable manner between the associated module member 60 and the other tripper end 73. When struck by a trigger 69, each tripper 70 is rotated against the normal action of its pad 74 which thereby acts as a shock absorber to a degree sufficient to permit the passage of the trigger 69 past the tripper 70. This momentary obstruction to the movement of the trigger 69 serves to prevent the tube 68 from aftward movement whereby the attached hooks 42 are actuated by the continued movement of the cradle 35 causing a simultaneous release of the straps 39. Each mine 18 is thereby separated from its cradle 35 at precisely the time it leaves the ejector module 58 during the jettison operation.

In order to facilitate the above actuation, each tripper end 72 is provided with a roller 75 at its outer end which is rotatably mounted as at 76 thereon and sized larger than the adjacent tripper end 72 to assure contact of it alone with the trigger 69. In addition the outer end of each trigger 69 is formed with a curved surface 77 which serves as a cam when coacting with the tripper 70, i.e., the roller 75 on the tripper end 72.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A deployment apparatus for stores from a vehicle during movement comprising:
   at least one carrier pallet formed by a plurality of parallel cradles each adapted to receive and secure one of said stores;
   releasable lock elements on each said pallet complemental to, for coaction with, lock elements on adjacent stationary structure of the vehicle operable to immovably secure said at least one pallet on said vehicle against relative movement;
   releasable connector elements carried by each said pallet to permit the interconnection of each said pallet with another similar pallet in vertical alignment;
   a drive mechanism engageable between each said pallet and cradle and operative to move said cradle linearly relative to said pallet;
   releasable coupling elements carried by each said drive mechanism whereby each said pallet is connectable to another said pallet with the cradles thereof disposed in fore and aft alignment;
   a releasable mechanism operative to permit movement of each said store relative to its cradle; and
   an actuator for the operation of said release mechanism at a predetermined location of said cradle in its movement by said drive mechanism.

2. The apparatus of claim 1 including complemental anti-friction elements carried by each said cradle and each said pallet to facilitate the relative linear movement of the cradle along the pallet when free to do so upon release of said lock elements and the operation of said drive mechanism as aforesaid.

3. The apparatus of claim 1 wherein multiple pallets are connected in fore and aft alignment and including an interconnection between the coacting lock elements aforesaid, and an actuator for said interconnection for the release of all said pallets in unison.

4. The apparatus of claim 1 wherein multiple pallets are connected in tiers and including an interconnection between said connector elements, and an actuator for said interconnection for the release of all said pallets in each tier in unison.

5. The apparatus of claim 1 wherein said release mechanism includes a plurality of straps between each said cradle and its associated store, at least one interconnection between all of said straps, and an actuator for said at least one interconnection for the release of all said straps in unison.

6. The apparatus of claim 1 wherein said drive mechanism includes a rack carried by each said cradle, a pinion gear carried by each said pallet, a drive shaft common to the pinion gears associated with each pair of adjacent cradles, and a clutch and brake operatively connected between each said pinion gear and said drive shaft.

7. The apparatus of claim 1 including an ejector module adjacent the aft end of said at least one pallet and having a bay corresponding to and aligned with each said cradle, anti-friction elements within each of said bays to receive and support each cradle as said cradle moves upon operation of said drive mechanism as aforesaid, and an independent drive mechanism carried by said ejector module operative at a preselected speed relative to that of each cradle drive mechanism aforesaid.

8. The apparatus of claim 7 wherein said release mechanism is carried by each cradle and includes at least one hook engageable with each end of a strap extending around each store and terminating on each side of said cradle, a trigger operatively connected to each said hook, and a tripper carried by said ejector module at the aft end thereof adjacent each bay to actuate each said trigger.

9. The apparatus of claim 7 wherein said independent drive mechanism is operative at a speed greater than that of each said cradle drive mechanism to thereby accelerate movement of each cradle therethrough.

10. The apparatus of claim 9 wherein said vehicle is an airplane having an internal hold with an opening in the aft end thereof and a door normally closing said opening, said door being movable to permit access to said hold, and wherein multiple pallets are connected in fore and aft alignment and in tiers.

* * * * *